United States Patent [19]

Hellers

[11] 4,199,828
[45] Apr. 29, 1980

[54] VACUUM TOILET APPARATUS FOR MOBILE UNITS

[75] Inventor: Bo G. Hellers, Malmö, Sweden

[73] Assignee: Evak Sanitar AB, Bromolla, Sweden

[21] Appl. No.: 4,233

[22] Filed: Jan. 17, 1979

[30] Foreign Application Priority Data

Jan. 23, 1978 [SE] Sweden ............................... 7800779

[51] Int. Cl.² .............................................. B60R 15/04
[52] U.S. Cl. .......................................... 4/321; 4/323; 4/431
[58] Field of Search .................... 4/431, 321, 432, 323, 4/433; 417/151

[56] References Cited

U.S. PATENT DOCUMENTS

| | | | |
|---|---|---|---|
| 744,044 | 11/1903 | Burnham | 417/151 |
| 1,791,513 | 2/1931 | Slocum | 417/151 |
| 2,449,441 | 9/1948 | Agra | 4/431 |
| 3,629,099 | 12/1971 | Gahmberg et al. | 4/321 |
| 4,120,312 | 10/1978 | Michael | 4/431 |

*Primary Examiner*—Lenard A. Footland
*Attorney, Agent, or Firm*—Beveridge, DeGrandi, Kline & Lunsford

[57] ABSTRACT

The disclosure relates to a vacuum toilet apparatus for mobile units, for example trains or buses, having at least one toilet stool from which faeces etc. are conveyed by means of a vacuum to a storage container by the intermediary of a conduit system. A pneumatic ejector is provided for producing the requisite vacuum. The ejector is supplied with compressed air from a compressed air reservoir. The air which is used for producing the vacuum is conveyed further to the storage container for the purposes of oxygenating the liquid in the container. The storage container is under atmospheric pressure and the conduit is connected to the container via a sluice which has a discharge valve in the form of a mechanically balanced flap valve which is opened by the weight of the contents of the sluice.

3 Claims, 4 Drawing Figures

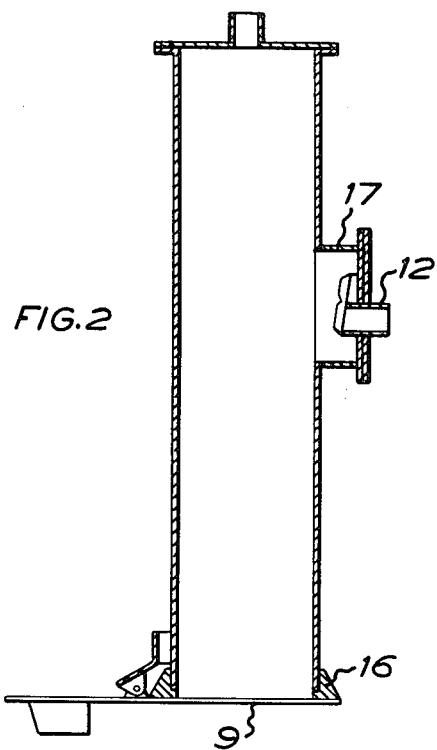

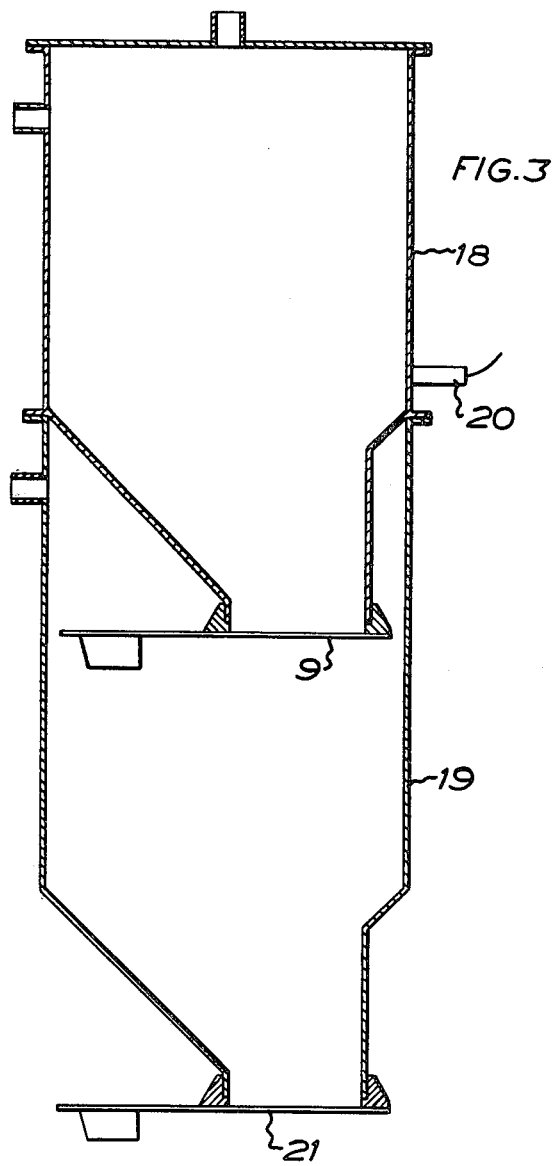

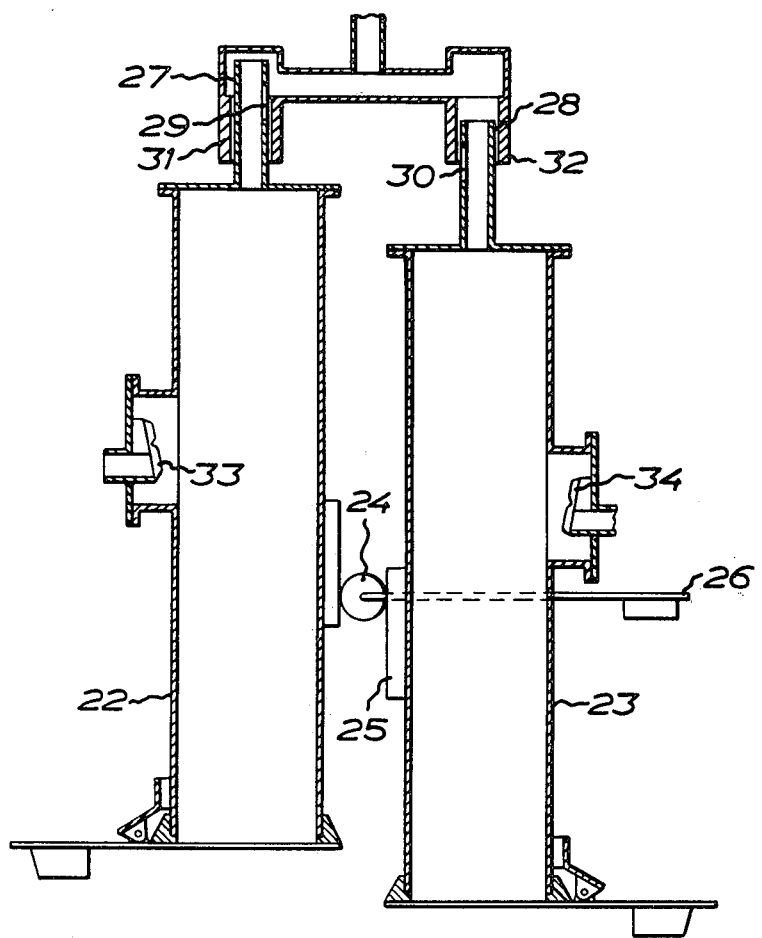

VACUUM TOILET APPARATUS FOR MOBILE UNITS

The present invention relates to a vacuum toilet apparatus with a storage container, for mobile units such as trains and buses.

The requirements placed on closed toilet systems on trains are becoming stricter and stricter. From the point of view of the environment it is unacceptable to discharge, freely and without control, excrement and urine together with toilet paper etc. along railway tracks. From the hygienic point of view, the shortcomings of prior art systems will be even more manifest, accentuated by the increase in internationalization of travel, with the inherent risk that the intestinal diseases of one country are spread to another in which immunity against these diseases is low or absent. Demands have also been voiced for an increased standard in the toilet facilities on trains so that these facilities approximate the quantity of domestic toilet arrangements.

In the same manner, there is a general desire for toilets on buses and, in most cases where such toilets are already installed, a desire for a higher standard than that offered by chemical dry toilets.

This requirement of an increased hygienic standard may only be met by water-flushing of the closet. Extant systems with flushing with the same water, with an addition of chemicals, a repeated number of times after the separation of the solid waste; or flushing a repeated number of times with oil which has been separated in the storage container from the liquid phase and waste cannot, on the long run, be accepted.

Nevertheless, a water closet installation in mobile units such as trains and buses requires problem solutions which are completely different from those involved in stationary installations in dwellings and public buildings. Since the flushing water must not only be carried as cargo at the beginning of the journey but also be carried as waste water to the end of the journey, the requirement that each flushing operation use a small amount of flushing water is high. Moreover, the effectivity of the flushing process must also be good. These requirements directly spotlight the vacuum closet as a solution.

A low total weight of the installation is another requirement in which, naturally, the water need is perhaps the greatest factor, but the installation in general must be designed with this requirement in mind.

For this reason, vacuum toilet installations for use in stationary units do not fit the bill, even though they satisfy the requirement of low water consumption, since their construction otherwise has been designed so as be too heavy and thereby too robust and sturdy. Such apparatuses operate fully satisfactorily but have, apart from their relatively great weight, a proportionately high power consumption which works against their use in mobile units.

The requirement of low power consumption and of an energy buffer so that the installation may function a certain time (for example, ten flushing operations) even when the primary source of energy is disconnected, is also an inherent requirement in these mobile installations.

From the point of view of labor hygiene in the waste emptying operation, aerobic conditions should prevail in the storage container, such that the generation of noisome gases is prevented or, in any event greatly reduced. The requirement of extensive degradation of the waste which may be placed on stationary installations is not, however, present here.

Finally, desires have been put forward that the installation is not dependent, from the point of view of electric supply, on a certain frequency and voltage system so that the installation is flexible as far as is possible.

Even if a great amount of work has, in particular in recent times, been devoted to the construction of mobile toilet apparatuses, no completely satisfactory solution has hitherto been presented. This relates, not least, to the general requirement that the solution be operationally reliable, simple and economically attractive.

The object of the present invention is to solve the above-mentioned problems in a vacuum toilet apparatus for mobile units, such as trains and buses, comprising at least one toilet stool, means for producing a vacuum, a storage container, conduits with valves for conveying matter from the toilet stool to the storage container by means of the vacuum, a sluice which is connected into the conduit ahead of the storage container and means for the supply of flushing liquid to the toilet stool. According to the major aspect of the present invention, the means for producing a vacuum consists of a pneumatic ejector which is connected to a compressed air reservoir, the compressed air which is supplied to the ejector for vacuum production being led, after the ejector, to the storage container for the purposes of oxygenating the contents of the container.

This vacuum toilet apparatus, which has been produced as the result of a function analysis applied to goal-attainment, also satisfies stringent requirements. It is based on the following constructional philosophy:

No rotary parts should be included;

Vacuum should be used as the means of conveyance for the waste, and for controling the valves;

Air should serve as an energy buffer and power transfer medium.

On the basis of these principles, a functional and simple apparatus has been constructed from the following starting elements: pneumatic ejector, material sluice, open storage container.

The nature of the present invention and its aspects will be more readily understood from the following brief description of the accompanying drawings, which show one embodiment, and discussion relating thereto.

In the accompanying drawings:

FIGS. 2 to 4 show different sluice constructions in longitudinal section.

Figure 1:
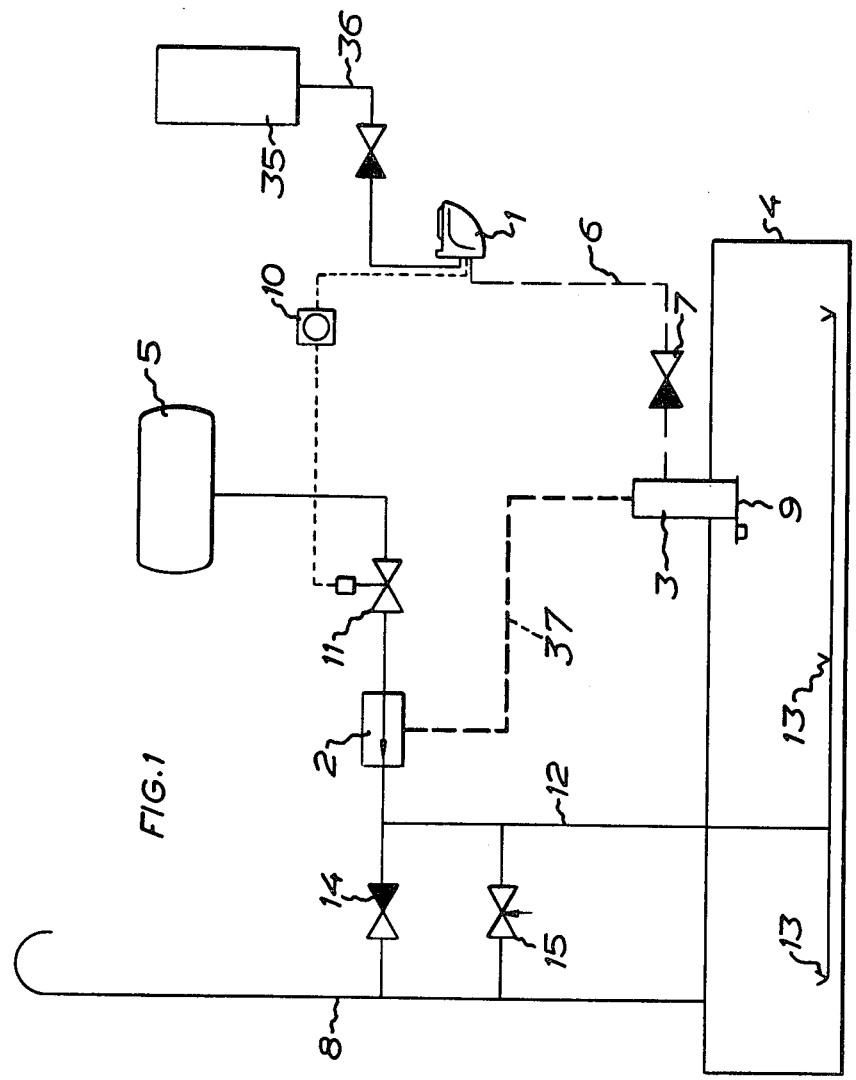
FIG. 1 is a coupling diagram for the apparatus according to the invention.

FIG. 1 shows a toilet stool 1, a pneumatic ejector 2, a material sluice 3, a storage container 4 and a compressed air reservoir 5. The sluice types which are partly known and are shown in FIGS. 2 to 4 offer, in combination with the remaining elements of the invention, different advantages.

The function of the invention will now be described with reference to the accompanying drawing figures;

The toilet stool 1 (FIG. 1) is connected to the sluice 3 by the intermediary of a conduit 6 and a non-return valve 7. The sluice is connected to the storage container 4 which, by means of a conduit 8 is placed in communication with the atmosphere.

The bottom valve of the sluice 3 is mechanically balanced so that when the sluice compartment is empty and not evacuated, the valve lightly abuts against its seat, that is to say the lower region of the walls of the sluice compartment.

When a flushing operation is effected, which takes place by means of flushing liquid from a container 35 by the intermediary of a conduit 36 with a valve, a signal is generated across a time relay 10 to a valve 11 which commences air supply from the compressed air reservoir 5 to the pneumatic ejector 2, whereby the sluice compartment 3 is evacuated via the conduit 37. The Ejector 3 is highly effective such that the requisite vacuum of about 2 to 3 m water column occurs within a few seconds. Thus, the force is generated which is required in order that the valve 9 of the sluice 3 will remain in the closed position even when water and waste from the toilet stool 1 resulting from an executed flushing operation are conveyed along the conduit 6 to the sluice 3.

Air from the ejector 2 passes along the conduit 12 to the storage container 4 where the conduit 12 discharges at the bottom of the container, the air being distributed in the waste liquid by means of nozzles 13. The air then leaves the storage container through the conduit 8. Because of this arrangement, the air simultaneously carries out the double function of creating, with low energy consumption, the requisite vacuum and realizing aerobic conditions in the storage container.

When the flushing operation is completed, the time relay 10 will discontinue, by the intermediary of the valve 11, the air supply to the ejector 2. The partial vacuum in the vacuum system 37, 3 then commences to draw in air by suction into the system, this being effected by the intermediary of the one-way valve 14 and the conduit 8 from the atmosphere. As a result, the closing force against the bottom valve 9 in the sluice is reduced so that the valve opens and releases the contents of the sluice into the storage container, whereafter the valve reassumes its initial position.

Should the contents of the storage container temporarily freeze, the stiff valve 15 will nevertheless ensure the rest of the flushing function (this being a general requirement) in that the exhaust air from the ejector 2 via the conduit 12 and valve 15 may be released into the atmosphere through the conduit 8.

The compressed air reservoir 5 is dimensioned such that its contents are sufficient for approximately 10 flushing operations. The operative pressure may be selected within the range of from 0.5 to 1 MPa gauge. If the unit in which the installation is installed has a central compressed air reservoir, the compressed air is connected hereto, whereby the electric power needs of the installation are limited to the low-current consumption of the control equipment. In cases where no central compressed air reservoir is provided, a compressor of suitable type is selected. Since the compressed air reservoir is large in relation to the momentary compressed air needs, a small compressor with low power consumption is advantageously selected, this causing longer running time which does not, however, damage the function of the installation thanks to the buffer effect.

The above description shows how forward thinking has succeeded in realizing, by the combination of relatively few simple, partly known elements, an installation which, apart from fully satisfying the above-outlined needs and demands, is also operationally reliable and economically advantageous.

An account will be presented below of a number of details concerning sluice constructions which while not being novel in detail, may impart to the invention various advantages.

FIG. 2 shows a simple sluice 3 with a bottom valve 9 which is mechanically balanced so that, in the initial position, that is to say when the sluice compartment is empty and under atmospheric pressure, lightly abuts against the valve seat. The pressure is such that if atmospheric pressure prevails in the sluice the valve will open even if but small amounts of matter enter into the sluice. The valve seat consists of the lower surface of the sluice walls 16, this being designed such that the abutment between the valve and the seat is vacuum-tight when the sluice is evacuated. Furthermore, the sluice is provided with an inlet 17 for the flushing matter from the toilet stool 1 and a connection socket for the vacuum conduit 12. In the initial position, the sluice is under atmospheric pressure and, in this embodiment, an electric flushing impulse is required from the toilet compartment.

FIG. 3 shows a double sluice which, in principle, is a combination of two single sluices according to FIG. 2 connected in series. In this case, the upper sluice 18 is constantly under vacuum, whereas the lower sluice 19 is under atmospheric pressure. When a flushing operation is effected, the flushing matter is collected in the upper sluice 18 and, if a level-sensing device is provided, for example a capacitative sensor 20, at a suitable height in the sluice 18, this starts an emptying cycle which consists of the phases that the sluice 19 commences to be evacuated, whereby the closing force on the bottom valve 9 of the sluice 18 is canceled, and this bottom valve 9 opens and empties the contents of the sluice 18 into the sluice compartment 19. The bottom valve 21 of the sluice 19 is then retained in the closed position by atmospheric pressure.

When the emptying operation is completed, the vacuum conduit to the sluice 19 is closed and air is allowed to flow in, the closing force on the bottom valve 21 of the sluice 19 being canceled and the contents of the sluice 19 being emptied into the storage container 4. At the same time, the closing force once again acts on the valve 9 so that the sluice 18 is once again ready to receive and store flushing matter. In this type of sluice, the upper sluice is always under a vacuum. A characteristic feature of this design is that several flushing operations may be carried out before it becomes necessary to empty the storage container, this reducing the compressed air need, and that flushing may be effected in the normal manner without any electric impulse.

FIG. 4 shows a double sluice which operates completely without electric servo-control and is, thus, completely independent of electric power. Two single sluices 22 and 23 each of the same type as the single sluice 3 in FIG. 2 are vertically movable with respect to each other so that when the one moves upwardly, the other moves downwardly the same distance. The coupling between the sluices 22 and 23 is effected via a gear wheel 24, by the intermediary of racks 25 so that the gear wheel executes a turning movement of from 90° to 180° when the sluices move from one extreme position to the other. A weighted arm 26 is fixedly mounted to the gear wheel.

Furthermore, each sluice is provided at the top with a piston 27, 28 with a valve opening 29, 30, cooperating each with a cylinder 31, 32 which are connected to a vacuum system 33. In the initial position, the sluice 22 is located in its upper position, the piston 27 in the cylinder 31 placing the sluice 22 under a vacuum by means of its valve opening 29. The bottom valve will then be in the closed position.

At the same time, the sluice 23 is located in its lowermost position, the valve opening 30 in the piston 28 being in communication with the atmosphere. The sluice 23 is, thus, under atmospheric pressure and the bottom valve is unbiased.

The weighted arm 26 is to be found in its right-hand position and weighs down the sluice 23 which cannot move upwardly until a corresponding weight in the form of flushing liquid has entered the sluice 22. The waste conduit 6 from the closet stool 1 is branched and is connected to the sluices 22 and 23 across non-return valves 33, 34.

When flushing is effected in the initial position, the flushing liquid is, therefore, drawn by suction to the sluice 22. If, at this point, the weight of the flushing liquid is capable of swinging the arm 26 over to the left, the sluice 22 will move to its lower position and will then come into contact, via the valve opening 29, with the atmosphere and emptying of the sluice 22 will take place, while the sluice 23 is connected into the vacuum system and is ready for the next flushing operation.

The weighted arm 26 may also be selected so as to be of such a weight that a number of flushing operations are required before the arm is swung over and realizes emptying of the sluice 22. As will be apparent to the skilled reader, this sluice functions fully mechanically without electronically controlled devices.

What I claim and desire to secure by Letters Patent is:

1. In a vacuum toilet apparatus for mobile units, comprising
   (a) at least one toilet stool;
   (b) means for producing a vacuum;
   (c) a storage container;
   (d) conduits with valves for conveying material from the toilet stool to said storage container by means of said vacuum;
   (e) a sluice connected into the conduit ahead of the storage container; and
   (f) means for supplying flushing liquid to the toilet stool,
   the improvement that said means for producing a vacuum consists of a pneumatic ejector which is connected to a compressed air reservoir, the compressed air which is supplied to the ejector for vacuum production being led, after the ejector, to the storage container for oxygenating the contents thereof.

2. The vacuum toilet apparatus as recited in claim 1, in which said sluice has an outlet valve discharging in said storage container, said valve being in the form of a mechanically balanced flap valve which is opened by means of the weight of the contents of the sluice.

3. The vacuum toilet apparatus as recited in claim 1 or 2, further comprising a sluggishly-operating valve coupled between said ejector and said storage container, said valve being operative to ensure the flushing function of the apparatus in cases when the contents of the storage container have become frozen to ice.

* * * * *